March 26, 1963 E. H. FRIEDMANN ET AL 3,082,646
VARIABLE SPEED TRANSMISSION MECHANISM
Filed Sept. 23, 1959 8 Sheets-Sheet 1

INVENTORS
Eric H. FRIEDMANN
Hendrik CANCRINUS
BY

ATTORNEYS

FIG. 3

March 26, 1963    E. H. FRIEDMANN ET AL    3,082,646
VARIABLE SPEED TRANSMISSION MECHANISM
Filed Sept. 23, 1959    8 Sheets-Sheet 4

INVENTORS
Eric H. FRIEDMANN
Hendrik CANCRINUS
BY
Wendroth, Lind & Ponack
ATTORNEYS March 26, 1963  E. H. FRIEDMANN ET AL  3,082,646
VARIABLE SPEED TRANSMISSION MECHANISM
Filed Sept. 23, 1959　　　　　　　　　　　　8 Sheets-Sheet 5

INVENTORS
Eric H. FRIEDMANN
Hendrik CANCRINUS
BY

Wenderoth, Lind & Ponack
ATTORNEYS

INVENTORS
Eric H. FRIEDMANN
Hendrik CANCRINUS
BY
Wenderoth, Lind & Ponack
ATTORNEYS March 26, 1963  E. H. FRIEDMANN ET AL  3,082,646
VARIABLE SPEED TRANSMISSION MECHANISM
Filed Sept. 23, 1959  8 Sheets-Sheet 7

INVENTORS
Eric H. FRIEDMANN
Hendrik CANCRINUS
BY

Wenderoth, Lind + Ponack
ATTORNEYS

March 26, 1963 E. H. FRIEDMANN ET AL 3,082,646
VARIABLE SPEED TRANSMISSION MECHANISM
Filed Sept. 23, 1959 8 Sheets-Sheet 8

INVENTORS
Eric H. FRIEDMANN
Hendrik CANCRINUS
BY
Wenderoth, Lind & Ponack
ATTORNEYS

United States Patent Office 3,082,646
Patented Mar. 26, 1963

3,082,646
VARIABLE SPEED TRANSMISSION MECHANISM
Eric H. Friedmann and Hendrik Cancrinus, Newlands, Cape Province, Republic of South Africa, assignors to Harmonic Gears (Proprietary) Limited, Windhoek, South-West Africa
Filed Sept. 23, 1959, Ser. No. 841,734
Claims priority, application Republic of South Africa Sept. 23, 1958
14 Claims. (Cl. 74—681)

This invention relates to variable speed transmission mechanisms of the type comprising differential gearing and speed variator or torque converter means.

Customarily, in variable speed transmission mechanisms of this type, the differential gearing has one of the rotary elements thereof connected to an engine or input shaft and has another of its rotary elements connected to a driven or output shaft, whilst the third rotary element of the differential gearing is adapted to have a controlling speed or torque applied thereto by means of a speed variator or torque converter.

The variable speed transmission mechanism just referred to makes use of the property of planetary gearing, epicyclic bevel-gearing or like differential gearing whereby, to any drive or torque applied by the input or driving shaft to any one of the rotary elements in the gearing, reaction is offered by the two other rotary elements in the gearing, namely, the element connected to the driven or output shaft and the third element connected to the speed variator or torque converter. The variator or control of the speed or torque applied to the said third element enables the speed ratio or torque conversion ratio of the transmission mechanism to be varied.

In variable speed transmission mechanisms of the aforesaid type, it has already been proposed to use speed variators or torque converters (hereinafter referred to as "speed variators") comprising variable-delivery hydraulic units which are reversible units capable of being used either as pumps or motors, or to use as speed variators, pairs of belt-driven or frictionally-driven units which are also reversible units, capable of being used either as a driving or accelerating unit or a retarding or driven unit, and adapted to apply a variable or controlling torque derived from the driving or input shaft to the third or controlling rotary element of the differential gearing.

Variable speed transmission mechanisms of the type stated have also been proposed in which the torque control applied to the controlling rotary element of the differential gearing is derived from a speed variator in the form of a pawl and ratchet (or other unidirectional transmission) device, the variation in this speed variator being obtained by displacing the pawl wheel and ratchet wheel or equivalent co-acting members from a position in which their axes are concentric with each other to a position in which they are to a greater or smaller degree eccentric to each other. This variator (being capable only of a unidirectional drive) is incapable of giving both ahead or forward transmission between the input and output shafts, and also reverse or backward transmission.

The various mechanisms previously known as aforesaid, are subject to disadvantages of differing nature and extent. Hydraulic units are invariably of very low efficiency. Friction wheels are also of low efficiency and their use is limited to the transmission of small horsepowers. Belt drives are chiefly disadvantageous on account of their large size, which renders them usually unsuitable for use in motor vehicle transmissions.

From the standpoint of efficiency and size, the positive mechanical speed variator, such as, e.g. a pawl-and-ratchet variator, is the most advantageous, but its limitation to unidirectional drives has hitherto excluded its use in cases where it is required to transmit a drive from the engine or input shaft to the output shaft in either a forward or reverse direction, at will, and, in particular, to transmit a forward drive at varying speeds from zero up to the speed of the engine and (for overdrive purposes) above that of the engine, and also a reverse drive at varying speeds, together with the capability of using the engine compression for braking purposes, or "hill-holding," when the input shaft and output shaft exchange (or tend to exchange) functions.

Generally it is the object of the present invention to provide a variable speed transmission mechanism of the type stated with a positive mechanical speed variator system whereby the engine or input shaft may be caused to transmit power to the driven or output shaft in either an ahead or reverse rotational direction and at speed ratios in either of these directions variable at will, and whereby also, if and when the speed of the driven shaft exceeds or tends to exceed the speed imposed thereon by the control exerted by the speed variator means and differential gearing, the mechanism will transmit a torque from the driven shaft to the input shaft, e.g. for braking purposes, by utilizing engine compression.

A further object of this invention is to provide a variable speed transmission mechanism of the type stated adapted to operate for the attainment of the several purposes just mentioned, without the use of clutches or provision of couplings or parts intended to be switched into action or substituted for other parts, at such times as different parts for particular purposes may be necessary.

Another object of the invention is to provide a transmission mechanism of the type stated which will have approximately the same mechanical efficiency as a normal hand-operated stepped gear box, and which will generally be lighter in weight and smaller in size than gear boxes with hydraulic variators or belt-driven variators and have a higher efficiency than mechanisms with hydraulic variators or friction-wheel variators.

A still further object of this invention is to provide a mechanism of the type stated which is capable, under the control of a single operating device, of transmitting to the output shaft, torque from the engine at speed ratios consistent with most economical and satisfactory running of the engine.

Finally, it is an object of the invention to enable these objects to be obtained with a transmission mechanism of the type stated which will require for its manufacture a minimum number of differing parts, so that the mechanism may be manufactured economically in large quantities by mass production methods.

According to the present invention, improved variable speed transmission mechanism, of the type stated, is provided, which comprises at least one pair of unidirectional speed variators, one of which has its input end connected to or geared with the engine or input shaft and its output end connected to or geared with a rotary element of differential gearing, and the other of which faces in the opposite direction to the first-mentioned variator and has its pawls and ratchet teeth or equivalent co-acting parts reversed in direction relative to the corresponding parts of the first-mentioned variator, its input end being connected to or geared with a rotary element of the differential gearing and its output end being connected to or geared with the engine or input shaft, and means whereby the pawl and ratchet or equivalent wheels of each variator are so arranged for lateral movement relative to each other that, when the axes of the wheels of the one variator are concentric or in line, or substantially concentric or in line, the axes of the wheels of the other variator are at their maximum eccentricity or displacement out of line, and vice versa.

With the variable speed mechanism according to the invention, forward speeds of the driven or output shaft are obtained from zero up to the full speed of the engine, and upward therefrom to such predetermined overdrive speed as the mechanism may be designed for, and also to obtain reverse speeds of the driven or output shaft from zero up to a predetermined limiting reverse speed. Thus, if, for example, the output end of the aforesaid first variator and the input end of the other or second variator are both respectively connected to or geared with the spider or cage carrying the revolving orbital wheels of the differential gearing, the following controls are obtainable by means of the co-acting oppositely-directed variators, namely:

(a) When the rotation of the spider or cage is in the same direction as that of the driving sun wheel of the differential gearing (i.e. a sun wheel directly mounted upon or connected to the engine or input shaft) and is equal in speed thereto, the orbital wheels and spider will rotate in such a manner that the sun wheel connected to or geared with the output shaft has the same speed as the aforesaid driving sun wheel and causes the driven shaft to be rotated in the same direction as the input shaft.

(b) If, however, the speed of rotation of the driving sun wheel, in the same direction as the rotation of the spider, exceeds twice the speed of rotation imparted to the spider, the output shaft is caused to rotate in a direction opposite to that of the input shaft.

(c) In like manner, when the speed of rotation of the revolving spider is greater than the speed in the same direction of the driving sun wheel, a rotation in the same direction as the engine shaft will be imparted to the output shaft at a speed which is greater than that of the input shaft.

In addition, when applied on or in a motor vehicle for example, the mechanism will operate in conjunction with the engine to hold the vehicle stationary on an uphill or downhill gradient when the transmission ratio is set at zero or neutral, and will serve for braking of the vehicle by the engine compression when (without alteration of the direction of rotation of the variators and gearing) the speed of the output shaft tends to exceed the speed imposed thereon by the control exerted by the speed variators and differential gearing.

In the aforesaid example, the first speed variator (having its input end connected to the engine shaft) acts to control the spider of the differential gearing for ahead and overdrive transmission, and acts as a positive drive to transmit torque between the output and input shafts when the compression of the engine operates to effect braking of the output shaft when it is rotating in the reverse direction. On the other hand, the other or second variator acts to control the speed of the spider for imparting reverse rotation to the output shaft; and acts as a positive drive to transmit torque between the output and input shafts when the compression of the engine operates to effect braking of the output shaft when it is rotating in the forward direction.

In the application of the invention to motor vehicle transmissions, where an internal combustion engine develops greater power when running at higher speeds, the transmission mechanism or gear box must be capable of reducing the speed of the engine shaft from the optimum speed for maximum economical engine power, to speeds on the output or driven shaft from zero to engine speed and overdrive in the forward direction, and from zero to the predetermined limiting speed in reverse. For this purpose, in the aforesaid example, each variator is connected to the engine shaft through toothed, chain-and-sprocket or other reduction gearing. Each variator is also connected to the controlling element of the differential gearing, by gearing having, e.g. a 1 to 1 speed ratio. For ease of manufacture and most effective transmission in this case, each variator is preferably arranged so that the wheel carrying the pawls is arranged within the wheel formed with the ratchet or toothed annulus, and so that the ratchet or annulus is at the input end of the variator and the pawl wheel at the output end. With this arrangement, the output speed of the variator is equal to or higher than the input speed.

In practice, the range of variation of the speed ratio (or, as it is sometimes termed, the "variator factor") is limited by the distance by which the pawl wheel can be displaced eccentrically with respect to the ratchet or toothed annulus, or vice versa, which distance is limited by the relative sizes of the pawl wheel, the ratchet wheel and the pawls. In order to increase the variator factor of the mechanism beyond the limit so imposed, each variator as hereinbefore referred to may consist of a combination of two or more individual variators in series, the pawl wheel of one of the variators in series being formed as a unit integral with (or so as to be laterally displacable in conjunction with) the ratchet wheel or toothed annulus of the other variator in series. In this case (the two variator combinations in train with the engine shaft and the controlling element of the differential gearing being throughout similar in construction, except that, as aforesaid, they face in opposite directions and have the respective pawls and ratchet teeth or equivalent co-acting parts of their variators reversed in direction), the aforesaid displaceable pawl and ratchet wheel units of the two oppositely-facing variator combinations may be mounted (e.g. in ball or roller bearings) in one and the same laterally displaceable carrier. Means is provided whereby lateral movement of the said carrier can be effected so as simultaneously (and each with uniform motion or otherwise) to adjust or set the variator combinations in their desired respective positions for the requisite changes in speed ratio and direction of rotation of the transmitted power. With this series-arrangement of the variators, each variator combination has a variator factor which is equal to the product of the variator factors of the individual series-connected variators.

As another or additional means of increasing the variator factor of the mechanism (or, alternatively, of reducing the factor in each variator individually when the variator factor has been pre-selected for the mechanism as a whole), the differential gearing may instead of consisting of a single differential unit, be constituted of two or more differential gears connected in series. To obtain the required output range with a limited variator factor, the ratio of one set of planetary differential gears can be chosen accordingly. In the case of bevelled differential gearing, a single bevelled differential unit may be insufficient to give the required range, and one or more bevelled units may have to be added.

For the invention to be clearly understood, reference will now be made to the accompanying sheets of drawings. From the following description, further features of the invention will be apparent.

The mechanism illustrated in the drawings is particularly suitable for use on motor vehicles, but may nevertheless find application for other purposes.

Figure 1:
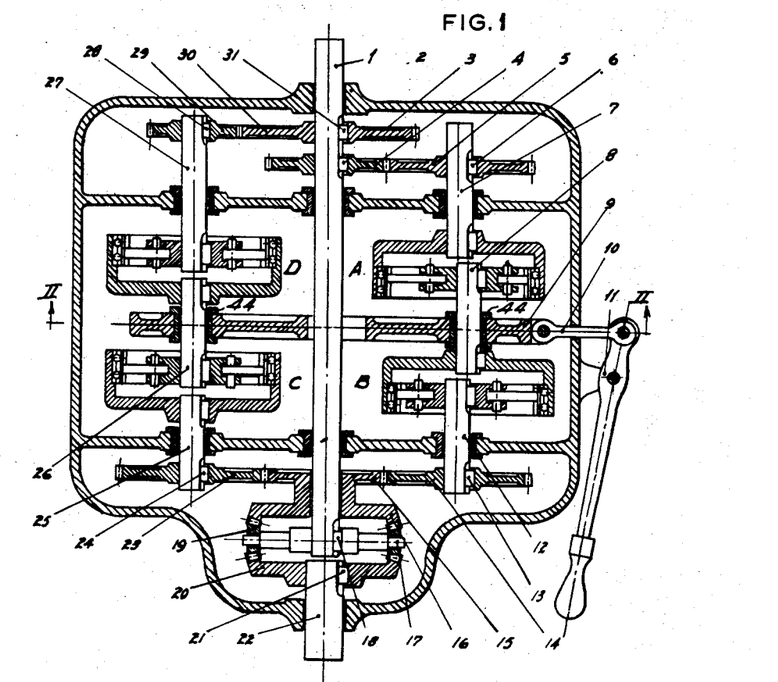
FIGURE 1 is a longitudinal cross-section of a transmission mechanism according to this invention.

In the drawings, more particularly FIGURE 1, reference numeral 1 denotes the input shaft connected to the prime mover or engine 125 (shown only diagrammatically in FIGURE 15), and extends into a housing 2 in which all the motion transmitting parts are located. On input shaft 1, and fixed thereto by key 3, is a gear wheel 4 which is in meshing engagement with gear wheel 5, which in turn is fixed by key 6 to shaft 7. Shaft 7 forms the driving shaft of the first speed variator assembly A. By means of shaft 8, journalled in lateral sliding carrier 9 and movable therewith, the first speed variator assembly 8 is connected to a second speed variator assembly B.

The said carrier 9 is connected by a link 10 to exteriorly located control means, conveniently shown as a hand lever 10 in FIGURES 1, 2, 3 and 10 for lateral displacement of the carrier for purposes subsequently to be described.

From the second speed variator assembly B a non-displaceable shaft 12 extends, and to the end of which gear wheel 14 is keyed by key 13. The gear wheel 14 meshes with gear wheel 15, which is integrally constructed with sun wheel 16 of a differential gear assembly E. Said integrally constructed gear wheels 15 and 16 are freely rotatable on the input shaft 1.

On the end of input shaft 1 spider 17 is fixed by key 18 for rotation with the shaft 1, while said spider 17 mounts the planet gear wheel 19 of the differential gear assembly E. Said planet gear wheels 19 are in constant meshing engagement with sun wheel 16 and a second sun wheel gear 20, the latter being fixed by key 21 to the output shaft 22, which is journalled in and extends from the housing 2.

The gear wheel 15 is also in meshing engagement with gear wheel 23, which is fixed by key 24 to a shaft 25, which in turn drives the third speed variator assembly C. Said speed variator speed assembly C drives the fourth speed variator assembly D through shaft 26. Shaft 26, like shaft 8, is journalled in carrier 9 for lateral displacement with said carrier, and simultaneously with, and to equal extents as shaft 8.

Speed variator D drives shaft 27, on which gear wheel 29 is fixed by key 28. Gear wheel 29 is in meshing engagement with gear wheel 30, which is fixed by key 31 to the input shaft 1.

Figure 2:
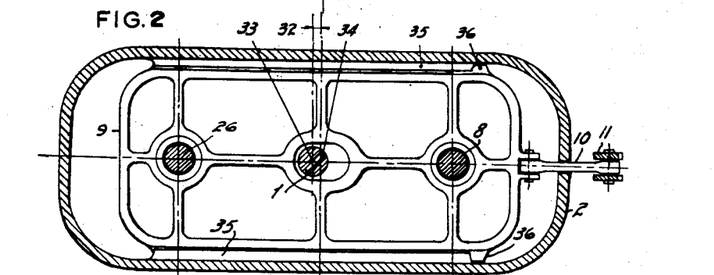
FIGURE 2 is a cross-section on line II—II of FIGURE 1, not showing the speed variators or gears, but only the laterally slidable carrier for displacing the movable parts of the speed variators.

The extent of lateral movement of the carrier, and consequently of shafts 8 and 26, indicated as 32, is the distance between the centres of the input shaft 1 and of the carrier 9 when said carrier is in any one of the two maximum displaced positions. Transversely, in the housing 2, channels 35 are provided for receiving tongues 36 provided on the carrier 9 for accurately mounting and guiding the said carrier.

Each variator assembly A, B, C and D comprises a pawl wheel assembly 40, fixed by key 41 to the shafts 8, 26, 12 and 27 as the case may be. The shafts 8 and 26 are journalled in bearings 44 in the carrier 9, and further have internally toothed wheel assemblies 42, fixed by keys 43, on the ends opposite to the ends having the pawl wheel assemblies. Such toothed wheel assemblies 42 are also provided on the ends of shafts 7 and 25.

Figure 4:
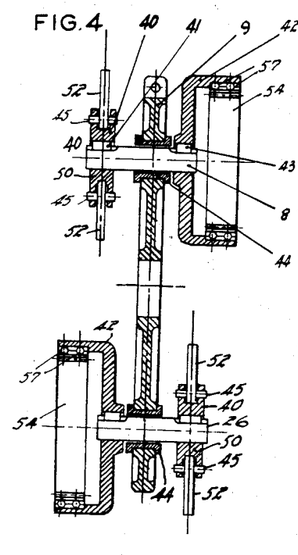
FIGURE 4 is a cross-section of the carrier shown in FIGURE 2, and of the associated lateral movable parts of the speed variators associated therewith.
Figure 5:
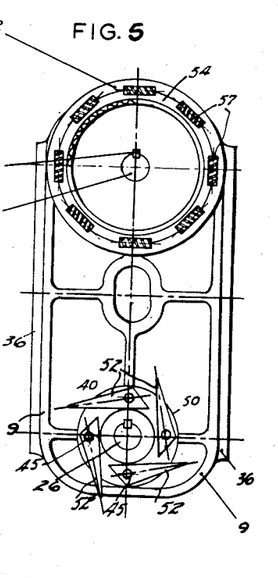
FIGURE 5 is an elevation of FIGURE 4.
Figure 6:
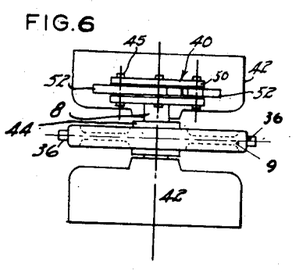
FIGURE 6 is a plan of FIGURE 5.

Each pawl wheel assembly 40 comprises a wheel 50 mounting at equal spaced intervals along a concentric circle on short spindles 45, pawls 52, in pivotal fashion (see FIGURES 4, 5 and 6).

Preferably the pawls 52 are mounted on star-like wheels 50 without spindles, the pawls 52 being provided with substantially circular mounting ends 46 engaging snugly and pivotally in part circular recesses 47 in the projecting ends 48 of the wheels 50. Said pawls are non-removably retained in the recesses 47 by side plates 58 on the wheels 50, and which plates are held in position by rivets 53. In the cavities 51 of the pawls 52, springs 55 are located, of which tangential ends engage the wheels 50 and the pawls 52 to normally bias such pawls outwardly into the operative position and into engagement with the teeth of the internally toothed ring 54.

Figure 7:
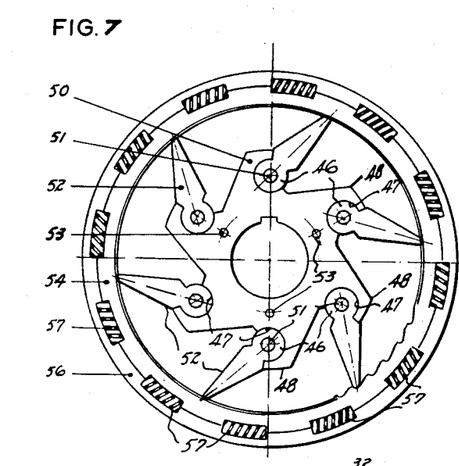
FIGURE 7 is an elevation of the co-acting pawl carrier with pawls and the toothed wheel of a speed variator, shown in the concentric positions.
Figure 8:
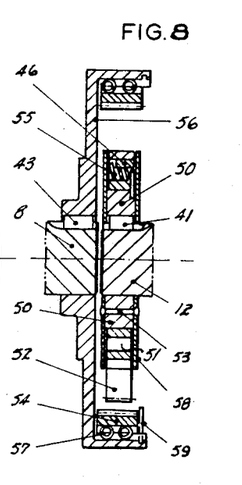
FIGURE 8 is a cross-section of FIGURE 7.

The internally toothed ring 54 is located internally of a flanged wheel 56 (see FIGURES 7, 8 and 9), and is capable of limited freedom of angular movement relative to such wheel 56 by providing spring buffers 57 bearing on buffering surfaces formed in recesses in such flanged wheel 56 and the toothed ring 54. Adjacent the free edge of the flange of the toothed wheel 56, a lubricant-retaining ring 59 is provided.

Figure 9:
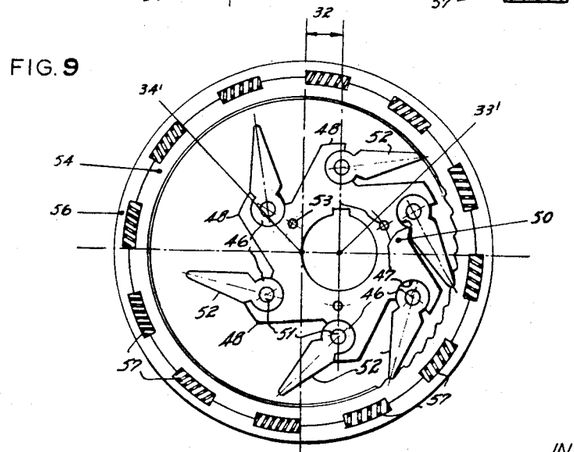
FIGURE 9 is a view similar to FIGURE 7, but showing the co-acting pawl carrier and toothed wheel eccentrically positioned.

Pawls 52 are constantly meshed with the internal toothed wheel ring 54. With the concentric positioning of the pawl wheel 50 in the flanged wheel 56 (see FIGURES 7 and 8), when the speed of the ring 54 is constant, the speed of the pawl wheel 50 is the same, and also constant. In the eccentric position as shown in FIGURE 9, when the flanged wheel 56 has a constant speed, the active pawl gives a small fluctuation of speed to the pawl wheel. Without resilient means, this small fluctuation can lead to an incalculable high force on the pawl. To absorb this fluctuation, use is made of said buffer springs 57 between internal toothed ring 54 and the flange of the flanged wheel 56.

In operation of the mechanism as described, the power from the prime mover is along the input shaft 1 to the planet gears 19 of the differential gears via the spider 17, and power is also transmitted from shaft 1 via the meshing gears 4 and 5 to shaft 7. The torque is brought over the assembly A via the pawls to shaft 8, and through speed variator assembly B to shaft 12. On operation of the lever 11 the alignment of the shaft 8 relative to shafts 7 and 12 may be varied or changed. As the shaft 1 has the spider mounting the planetary gears 19 fixed thereto, and due to the drive via shafts 7, 8, 12 and gears 14 and 15, and the integrally constructed sun wheel 16 of the differential gearing, two members of the differential gearing are regulated, causing the sun wheel 20 to revolve at a speed dependent on the aforesaid members. The mechanism so far described, because of this arrangement, can transmit torque in one direction only through the output shaft 22. To obtain a torque in the opposite direction on the output shaft, the two speed variators C and D are added to the system. To create a negative torque on the output shaft, planet wheels 19 reverse the direction of the torque by employing spider 17 (connected to input shaft 1) as anchor point, thus bringing the torque over to sun wheel 16 and gear 15 via gear 23 to the input shaft 25 of variator assembly C, and via pawls to shaft 26, and through variator D along shaft 27 to gear 29, while from gear 29 the torque is applied back to the input shaft 1.

The variator assembly A and assembly B work in series and can be considered as one variator. The same applies to variator assemblies C and D. Assemblies C and D have their input end shaft 25 opposite to the input shaft 7 of assemblies A and B. Both sets of variators A, B and C, D are unidirectional, but the action of one set is opposed to the other.

When the pawl wheel 50 is concentric to the toothed ring 54, the ratio of the variator is 1:1. In FIGURE 9 the pawl wheel centre 33' is shown in its extreme eccentric position relative to the centre 34' of the toothed ring 54, whereby the highest ratio factor is obtained. In in-between positions the ratio factors vary from 1 to the maximum.

In FIGURE 1 (and also in FIGURE 3) the variator assemblies A and B are shown in their extreme eccentric positions. The pitch distance of shaft 8 and shaft 26 is so set that as shaft 8 is eccentric to its maximum, shaft 26 is concentric. By operating the carrier 9, these positions can be reversed, whereby shaft 26 can be brought to its maximum eccentricity and shaft 8 to a concentric position. Any values in between these two extremes are thus obtainable.

It will be apparent that since not only the input end of the first set of variators A and B is geared to the engine or input shaft, but also the output end of the second set of variators C and D is geared to the input shaft, the output speed of the second set of variators C and D must necessarily be the same as, or in a fixed or pre-determined relationship to the input speed of the first set of variators A and B. The transmission mechanism must accordingly be so constructed as to ensure that the said output speed is equal to, or in a pre-determined relationship to, the said input speed. It must also be so constructed as to ensure that, despite such changes as occur in the product of the variator factors of two sets of variators as and when each variator factor of the individual variators of each pair is varied (i.e. when the axes of the pawl wheels and toothed wheels of the individual variators are brought more or less into line or laterally displaced with respect to each other), the mechanism continues to operate satisfactorily. For these purposes, whilst also having regard to the required range of output speeds, the gearing included in the mechanism is designed on the basis that the overall variator factor of the two sets of variators is equal to the maximum value of the product of the variator factors of the individual sets of variators for the whole range of the various more or less aligned or laterally displaced positions of their respective parts. For example, we may design on this basis the gearing whereby the output end of the second set of variators C and D is connected to the input shaft 1. With this basis, it can be ensured that for all positions as aforesaid, there will be provided between the toothed wheel and the pawls of the variators a sufficient safety margin or freewheeling action to ensure that at no time will locking of the gears or fouling of the teeth and pawls take place. For example, in the case of a pair of oppositely arranged speed variators controlling the sun wheel 16 of a differential gearing E as aforesaid, if the maximum value of the variator factor of each variator is 1.9 and the minimum value thereof 1.0, then, when the toothed wheel and pawl wheel of the one variator are at their maximum eccentricity or displacement, and the toothed wheel and pawl wheel of the other variator are in line, the overall variator factor for the two variators will be $1.9 \times 1.0 = 1.9$. When, on the other hand, the pawl wheel and the toothed wheel of each of the variators are set in certain positions between their said extreme positions, the variator factor of the one variator may be about 1.6 and that of the other variator about 1.3. In this case, the overall variator factor for the two sets of variators will be $1.6 \times 1.3 = 2.1$ approximately, which is the maximum value of the overall variator factor of the two variators, and is the value of the overall variator factor on the basis of which as aforesaid the gearing will be designed.

As already indicated, the overall variator factor for the two sets of variators does not have a precisely constant value for all relative positions of the pawl and toothed wheels of the variators in the lateral plane, at least when the parts of the first and second sets of variators which are interconnected or mounted on a common carrier for lateral displacement are positioned relatively to each other a fixed distance apart and partake of the same uniform lateral movement for purposes of varying the speed ratios of the variators. If desired, however, a constant (or more nearly constant) value of the overall variator factors of the variators may be obtained for all relative lateral positions of the pawl and toothed wheels by superimposing upon the uniform or common lateral movement of the aforesaid interconnected parts, a compensatory lateral movement of these parts relative to each other, so that at each lateral setting of the interconnected parts or, more specifically, at each lateral position of the common carrier supporting these parts, the respective parts are drawn closer together or pushed further apart so as to ensure that in each aforesaid setting or position, if there is a temporary or localised rise of the variator factor of the first set of variators above the normal or average value in that setting, it will be offset or compensated by a localised decrease in the setting below the normal, of the variator factor of the second set of variators, or vice versa. For this purpose, the laterally displaceable part of the first set of variators A and B may be mounted in one laterally movable carrier 9a (see FIGURES 10 and 11), and the laterally displaceable part of the second set of variators C and D may be mounted in another laterally movable carrier 9b, and cam, wedge or like member 88 may be provided to impart to the said parts the requested compensatory or compensated lateral movement aforesaid. The said cam, wedge or like member 88 may be turnable, slidable or otherwise movable for purposes of its operation on the said carriers 9a and 9b by means of lever 11 or other actuating member.

Figure 10:
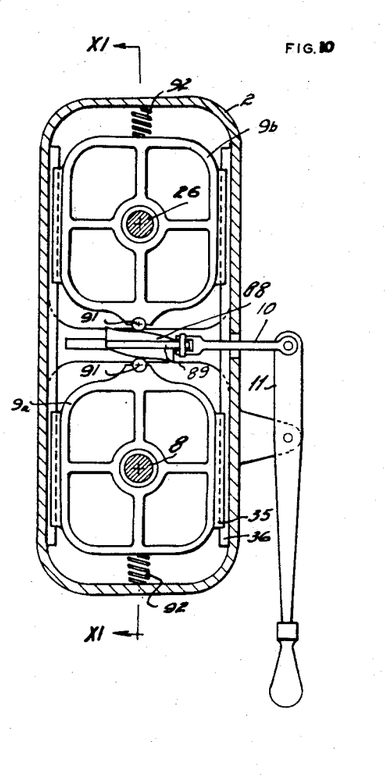
FIGURE 10 is a view substantially similar to FIGURE 2, but showing a modified construction of the laterally slidable carrier and operating means.
Figure 11:
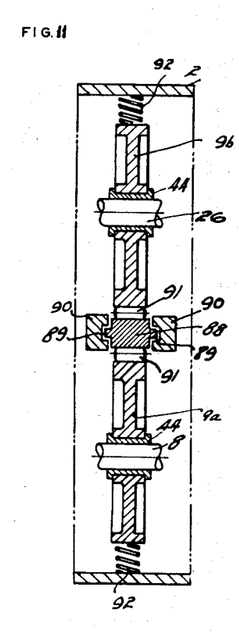
FIGURE 11 is a cross-section on line XI—XI of FIGURE 10.

In the preferred arrangement, as shown in FIGURES 10 and 11, the member 88 is a sliding cam or wedge 88 having tongues 89 which are slidingly arranged in fixed guiding channels 90 mounted in the casing 2. The carrier parts 9a and 9b provide rollers 91 for engaging the sliding cams 88 and are held in constant engagement therewith by biasing spring 92 acting between the housing 2 and the parts 9a and 9b. In carrier part 9a, the shaft 8 is journalled in bearing 44 and likewise shaft 26 in part 9b.

In practice, the laterally displaceable parts of the first and second sets of variators A, B and C, D may be so disposed or movable relative to each other in their common carrier 9 or separate carriers 9a and 9b as aforesaid that when the displaceable parts of the two sets of variators are located at either of their extreme positions, the displaceable parts of the one set of variators are not precisely concentric with the relatively fixed parts of that set of variators but are offset slightly beyond or outwardly from the concentric positions. In this arrangement, the displaceable parts of the other set of variators, when the displaceable parts of the two sets of variators are in either of their extreme positions, are offset or displaced a correspondingly increased distance beyond the maximum eccentric position which they would otherwise occupy in the aforesaid position. The gain or increase in the overall variator factor due to this additional offset or eccentricity is greater than the loss or decrease in the overall variator factor due to the misalignment or offset beyond concentricity of the displaceable parts of the first-mentioned set of variators. Hence, in the result, it is possible to obtain with such an arrangement an enhanced overall variator factor.

Figure 12:
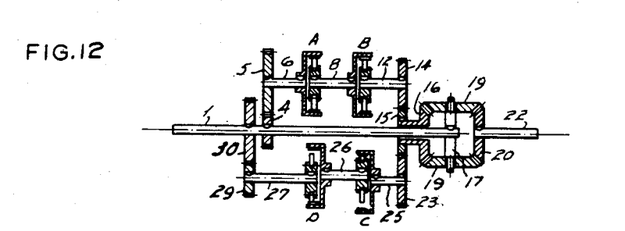
FIGURE 12 is a diagrammatic illustration of the mechanism shown in FIGURE 1.

The arrangement of the mechanism shown diagrammatically in FIGURE 12 shows the differential gearing E of which the spider 17 of the planet gears 19 is connected to the input shaft 1 and a sun wheel 16 to the variators A, B, C and D. The other sun wheel 20 is fixed to the output shaft 22.

Figure 13:
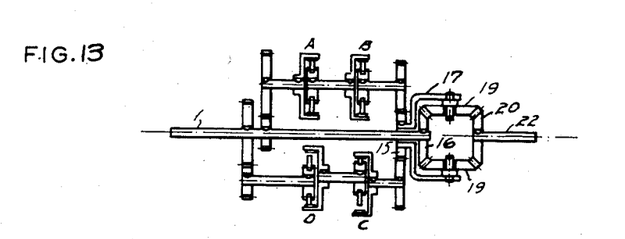
FIGURE 13 is a view similar to FIGURE 12, but showing a modified arrangement of driving the differential gears.

In FIGURE 13, an arrangement is shown in which sun wheel 16 is connected to the input shaft 1 whereas the spider 17 is connected to the variators A, B, C and D and the other sun wheel 20 to the output shaft 22.

Figure 14:
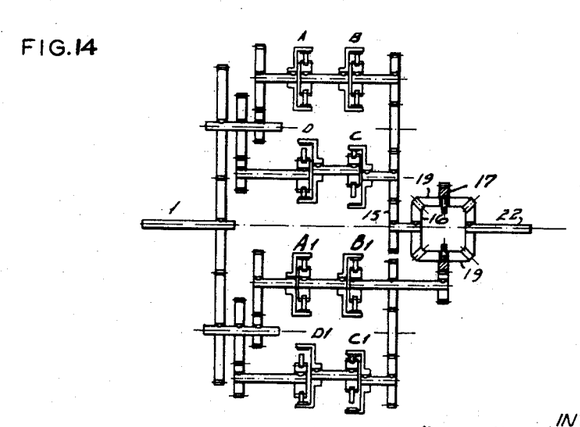
FIGURE 14 is a further diagrammatic illustration embodying a further modified arrangement of the mechanism according to this invention.

FIGURE 14 shows diagrammatically a sun wheel 16 of the differential gearing connected to two sets of variators A, B and C, D whereas the spider 17 of the planetary gears 19 is connected to sets of variators A1, B1, and C1, D1. The output shaft 22 is connected to the sun wheel 20.

Figure 3:
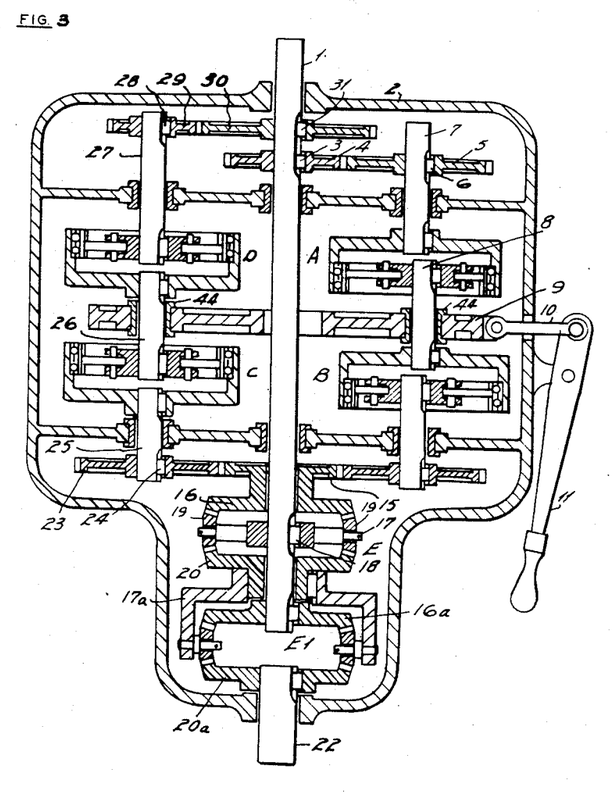
FIGURE 3 is a view similar to FIGURE 1, showing a modified arrangement of the invention.

For increasing the variator factor of the mechanism the differential gearing may, instead of consisting of the single differential unit E, consist of two differential gear units E and E1 which are connected in series. This arrangement is clearly shown in FIGURE 3. The sun wheel 20 of the differential E, instead of being connected to the output shaft 22, is keyed to the spider 17a of the second differential gearing E1 while the input shaft 1, to which the spider 17 of the first differential gear E is fixed, is also fixed to the sun wheel 16a of the second differential gear E1. The first epicyclic differential bevel gear may, if desired, have its driving sun wheel 16 connected to the input shaft 1, two oppositely facing variators or variator combinations connected to its spider 17 and the output sun gear connected to the spider 17a of the second epicyclic bevel gear E1, the driving sun wheel of which second bevel gear E1 is also connected to the engine shaft and the output end sun gear 20a connected to the driven or output shaft 22. The speed variators and the various drives of the mechanism shown in FIGURE 3 are substantially similar to that shown in FIGURES 1 and 2.

If desired, in the application of a motor vehicle or other engine, of the variable transmission mechanism or gear box according to this invention, means may be provided whereby the said mechanism or gear box, in addition to being under the control of the foot pedal, hand lever or the like operable by the driver or operator, is placed under an auxiliary control by an operating device which will be brought into action when fluctuation (or undue fluctuation) occurs in the torque in the input shaft 1 between the engine and the mechanism or gear box, and which will act so as to compensate for and/or reduce these fluctuations by causing the speed ratio of the gear box or mechanism to be increased when, for the purpose just stated, the engine power has to be increased, and to be decreased when, for the said purpose, the power has to be decreased.

The said auxiliary operating device may be arranged so as to function for forward or ahead driving of the output shaft and over a predetermined range of engine speeds, and be provided with a cut-out device or switch whereby it is cut out of operation otherwise than during these operating conditions as, for example, when the foot pedal or operating member of the gear box is moved to cause the output shaft to rotate in reverse.

Figures 15, 16:
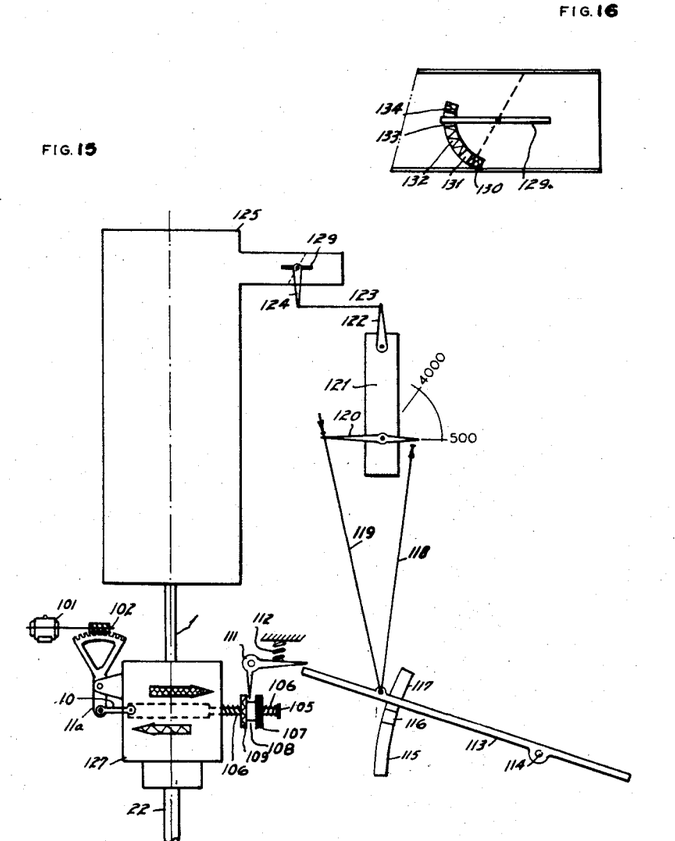
FIGURE 15 is a schematic layout of controlling means when the mechanism is employed as a torque converter.
FIGURE 16 is a larger scale schematic layout of the throttle valve of an internal combustion engine for control by the means shown in FIGURE 15.

To make the gear box work as a torque converter, a schematic lay out is shown in FIGURE 15. For control and operation a foot pedal 113 is provided with its fulcrum intermediately of its ends as at 114. Said pedal 113 makes electrical contact with and through three contacts, namely 115, 116 and 117. Contact 117 brings into electrical operation lever 111 (for neutral and reverse action), contact 116 is insulated and does not permit passage of any current while contact 115 brings into electrical operation the contact members 130, 131, 132, 133 and 134 for normal forward drive. To operate the gear box 127, use is made of a two directional electric motor 101 which operates a worm and worm wheel 102. Worm wheel 102 is associated with lever 11a which in turn is connected by link 10 to the carrier 9 or the carrier operating means 88 in the gear box. The internal combustion engine 125 is connected by shaft 1 to the gear box 127. When the carrier 9, or parts 9a and 9b in the gear box is shifted, extension 105 is moved correspondingly.

Fitted loosely on extension 105 is a grooved collar 103 held in position by springs 106. On grooved collar 103 are two insulated electrical contact rings 107 and 109 which are able to make contact under certain conditions with a lever 111. Contact 107 controls the current to the motor 101 in such direction that the ratio of the gear box moves from zero to reverse. Contact 109 moves the ratio of the gear box from reverse to zero and a little over. By depressing with the heel the foot pedal 113 below the fulcrum point 114 these operations are brought into effect via the contact 117. At the same time, rod 118 brings governor 121, dependent on the extent of depression of the foot pedal in the said direction, on to higher revolutions via lever 120. The above-mentioned operations are for neutral and reverse.

For forward drive, foot pedal 113 has to be depressed in the opposite direction to contact part 116, meanwhile bringing the revolutions of the governor 121 up via rod 119 and lever 120 and then makes contact with the contact region 115. The electric motor 101 is now operated via such contact 115 and the contacts 130 to 134. Contacts 130 and 134 cause rotation of the motor 101 in such a direction that the ratio of the gear box increases. Contacts 131 and 133 are dead contacts while contacts 132 determines the direction of rotation of the motor 101 for the ratio of the gear box to be decreased. In forward drive the mechanism works as follows. Foot pedal 13 is depressed thus increasing the controlled revolutions of the governor 121 which in turn operates throttle valve 129 (see FIGURE 16) via levers 122 and 124 and link 123. In FIGURE 16, throttle valve 129 is shown according to a larger scale. Assume the gear box is in its neutral position, then, as soon as the engine 125 has reached the indicated number or revolutions controlled by the governor 121, which takes place in a very short time, the governor 121 will cause the throttle valve 129 to move to its closing position due to the fact that the engine has no work to perform. When the throttle valve 129 makes contact with the contact 132, the gear box is shifted into a lower ratio thus causing the engine 125 to deliver work thus causing the governor to open up the throttle valve 129 to a certain extent. If the throttle valve is opened to the extent that it reaches contact 133, the balance is found between the amount of power delivered by the engine over the ratio of the gear box to the same amount of power required by the output shaft 22. If the governor opens the throttle valve further due to overloading of the engine, contact is made with contact 134 thus shifting the gear box to a higher ratio. Thereafter, the sequence follows as previously described. When the engine overruns the indicated or controlled governor speed (when travelling downhill) the governor closes the throttle valve 129 thus making contact with contact 130. Contact 130 causes operation of motor 101 for the ratio of the gear box to increase. When the ratio of the gear box is high enough, the engine 125 will be able to hold the torque against compression. Throttle valve 129 then moves via governor 121 to the position for contacting contact 131.

From the above description, it follows that the forward speed of the vehicle is dependent on the amount of depression of the foot pedal 113. The gear box thus operates as a torque convertor.

Embodied in the transmission means, if necessary or desirable, and between the gear box and the load, any suitable form of so-called overload slip coupling or safety device may be provided so as to avoid any injurious overstrain of the transmission means and/or gear box or breakages therein consequent upon an overload.

Figure 17:
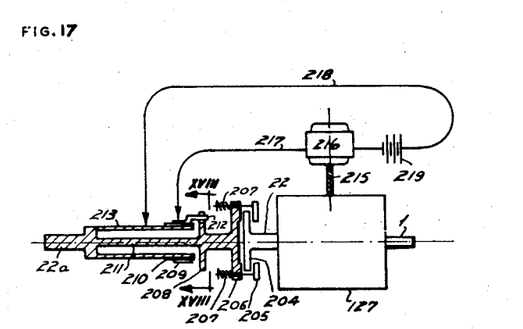
FIGURE 17 is a schematic layout of a safety device to prevent damage of the components of the transmission.

Since the gear box is designed for a maximum torque it is expected to transmit during operation, the torque could, due to the infinite variation, exceed the maximum torque for which the gear box is designed, particularly in the vicinity of the neutral or zero position of the gear box. By way of example, such means consists of a friction disc 204 provided on the output shaft 22 and held by members 205 and 206 which are biased by springs 207. By adjusting the tension of the springs 207 in accordance with the maximum predetermined torque, slip will occur when the torque exceeds the maximum permissible value.

Figure 18:
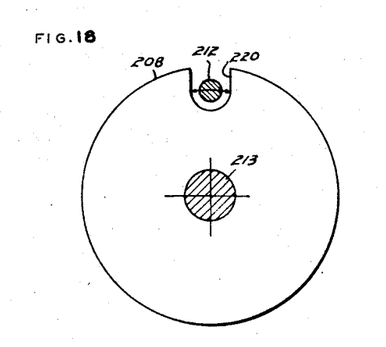
FIGURE 18 is a schematic cross-section on line XVIII—XVIII of FIGURE 17.

As slip means loss of energy and wear of parts, this slip is not desirable and consequently use is made for automatically changing the ratio of the gear box by means of an electric motor 216 connected by screw means 215 to the carrier 9 (or 9a and 9b) of the gear box 127. The motor 216 is operated only when the torque on the output shaft 22 exceeds its predetermined maximum value on completion of an electrical circuit. Said electrical circuit is controlled by pin 212 which under normal conditions of operation is positioned centrally in a notch 220 in disc 208. In such position, the pin 212 does not contact any of the sides of said notch 220. Pin 212 is connected to ring 209 which is in electrical contact with conductor 217. Ring 209 and 210 are electrically insulated. Disc 208 is in electrical contact with conductor 218 so that when pin 212 makes contact with disc 208 the electrical circuit to battery 219, motor 216 through conductor 217 and 218 is completed. The pin 212 is held in its inoperative position by the casing 213. By applying a torque to the torsion bar 211 this bar is twisted through a certain angle. Such torsion bar is constructed so that when the calculated maximum permissible torque is reached and slippage occurs between the members 204 and 206 the pin 212 engages the side of the notch 220 and as a result thereof the motor 216 comes into operation to cause movement of the carrier 9 or composite carrier parts 9a and 9b for changing of the gear box ration. Reference numeral 22a denotes the continuation of the driving shaft 22.

As will be appreciated, while the invention has been hereinbefore described with particular reference to a transmission mechanism for motor vehicles, mechanisms made in accordance with the invention have other applications for many different kinds, as for example to transmission mechanisms for use in connection with lifts or cranes, or in connection with ship steering or ship propulsion, automation in respect of industrial and manufacturing plants of all types and generally where variable speed transmission mechanism affording effective and prompt control is required.

It will be understood that in carrying out our invention in practice, whilst we prefer to use pawl and ratchet means in the sense of pawl and ratchet gear having tooth-shaped devices which engage with each other by positive abutment or projection the one against or into the other, unidirectional driving means of other form may be used such as, for example unidirectional transmission means in which the driving engagement is effected by balls, rollers or shoes which become wedged and thereby locked between the driving and driven parts of the said means for transmission purposes.

For convenience in construction of a speed variator having pawls and a coacting ratchet or toothed wheels, the pawls may be arranged in parallel rows in the pawl wheel which may, if necessary for this purpose, be widened in the axial direction. Preferably, the pawls in the one row are angularly offset or staggered with respect to the pawls in the adjacent row or rows.

We claim:

1. A variable speed transmission mechanism comprising an input shaft adapted to be driven from a prime mover, an output shaft, differential gearing having three intermeshing rotatable elements, one of which is a rotatable spider having freely rotatable planet gears mounted thereon and the other two being sun gears which are in intermeshing engagement with said planet gears, one of the sun gear rotatable elements being connected to the output shaft and one of the other two intermeshing rotatable elements being connected to the driven input shaft and speed variator means drivingly connecting the remaining intermeshing rotatable element to the input shaft, said speed variator means comprising two pairs of unidirectional speed variator devices, each speed variator device consisting of two coacting wheels of which one has a toothed annulus and the other having pawls mounted thereon and engaging said toothed annulus for motion transmission, each pair of speed variator devices having a toothed annulus wheel of one of the two coacting wheels of one speed variator device in the pair and a pawl mounting wheel of the other of the two coacting wheels of the other speed variator device in the pair which are together transversely movable relative to the axis of their respective coacting wheels from a position coaxial with said respective fixed coacting wheels to positions eccentric to the axis of the respective fixed coacting wheels for motion transmission at equal and at different speeds than the speeds of said respective fixed coacting wheels respectively, one pair of said two pairs of speed variator devices having its input end connected in motion transmissible fashion to said input shaft and its output end similarly connected to the said remaining element of the other two intermeshing rotary element of the differential gearing and the other pair of speed variator devices having its input end connected in motion transmissible fashion to the said remaining intermeshing rotary element of the differential gearing and its output end similarly connected to the input shaft, at least one carrier in which the laterally movable wheels of the two pairs of unidirectional speed variator devices are mounted, and lever operating means for moving said carrier, whereby when said laterally movable wheels of one pair of variator devices are laterally displaced for speed variation from a non-speed variating position, the laterally movable wheels of the other pair of speed variators are displaced from their speed variating position towards their non-speed variating position, so that forward speeds of the output shaft from zero up to full speed of the prime mover driving the input shaft and upwardly thereof to an overdrive speed of the mechanism are possible whereas the said output shaft is capable of reverse rotation at speeds from zero up to a predetermined limited speed.

2. A variable speed transmission mechanism, as claimed in claim 1, in which there is only a single laterally displaceable carrier on which the two laterally movable wheels of the two pairs of variator devices are freely rotatably mounted, said carrier being connected to the operating lever means.

3. A variable speed transmission mechanism, as claimed in claim 1, wherein said carrier having the laterally displaceable wheels of the pairs of variator devices mounted thereon is movable laterally to either of two extreme positions, in which positions said displaceable wheel of the one pair of variator devices is offset slightly beyond the concentric position with the relative coacting fixed parts of that pair of variator devices and the displaceable wheel of the other pair of varator devices is offset and displaced a correspondingly increased distance beyond the maximum eccentric position, whereby the gain in overall variator factor is greater than the loss in the overall variatior factor resulting in an enhanced overall variator factor.

4. A variable speed transmission device as claimed in claim 1 in which the output end of the one pair of variator devices and the input end of the second pair of variator devices are both connected in motion transmissible fashion to the remaining sun wheel of the differential gearing and the input shaft is fixed to the spider carrying the revolving planet gears.

5. A variable speed transmission device, as claimed in claim 1, in which the output end of the one pair of variator devices and the input end of the second pair of variator devices are both connected in motion transmissible fashion to the spider carrying the revolving planet gears of the differential gearing, and the input shaft is fixed to the remaining sun wheel of the differential gearing, whereby the speed and direction of rotation of the output shaft are the same as that of the input shaft when the direction of rotation of the spider with its planet gears and the sun wheel on the input shaft is the same in direction and the speeds are equal whereas the direction of rotation of the output shaft is opposite in direction to that of the input shaft when the direction of rotation of the sun wheel of the differential gearing which is on the input shaft is in the same direction as the rotation of the spider and exceeds twice the speed of rotation of the spider, while the rotation of said output shaft is in the same direction as the input shaft but at greater speed when the speed of rotation of the revolving spider of the differential gearing is greater than the speed and is in the same direction as the sun wheel of the differential gearing which is on the input shaft.

6. A variable speed transmission mechanism, as claimed in claim 5, in which said two pairs of variator devices are geared to said input shaft as well as to the spider carrying the planet gears of said differential gearing, the gearing from the input shaft to the input end of one variator device comprising a small gear wheel on the input shaft and a larger gear wheel on said input end of said one variator device, and the gearing between the output end of the other variator device and the input shaft comprises a larger gear wheel on said output end and a smaller coacting gear wheel on said input shaft, and a common gear on the said spider on which the other ends of the respective variator devices act, the gear ratios of the mechanism being such that the overall variator factor of the two pairs of variator devices is equal to the maximum value of the produce of the variator factors of the individual variators for the whole range of the various aligned and laterally displaced positions of the respective parts.

7. A variable speed transmission mechanism as claimed in claim 5, in which each unidirectional speed variator device provides output speeds varying from equal to higher speeds than the input speed, each variator having the wheel carrying the pawls positioned within the wheel having the toothed annulus, the wheel having the toothed annulus being the input end and the pawl wheel being the output end, the variator devices of each pair being in series, a shaft connecting the pawl wheels of one of the series arranged pair of variator devices to the toothed annulus of the other variator and forming a unit of the wheels of the two pairs of speed variators which are laterally displaceable, whereby each series arranged pair of speed variator devices produces a variator factor which is equal to the product of the variator factors of the individual series connected variator devices and the limited range of speed ratio and the variator factor of each variator device, on displacing the pawl wheel eccentrically with respect to the toothed annulus and vice versa, is increased.

8. A variable speed transmission mechanism, as claimed in claim 7, wherein a safety margin is provided between the toothed annulus and the pawls of the various variator devices for freewheeling action and for elimination of locking of the gears or fouling of the teeth and pawls.

9. A variable speed transmission mechanism, as claimed in claim 7, in which there is a pair of laterally displaceable carriers each of which has rotatably mounted thereon the laterally displaceable wheels of one pair of variator devices, and means connected to said carriers for imparting to them a common lateral movement and a simultaneous compensating lateral movement relative to each other for each lateral position of the movable wheels of the pairs of speed variator devices, the means for imparting the compensating lateral movement drawing the respective carriers closer together and pushing them further apart relative to one another, whereby in each lateral position a temporary localized rise of the variator factor of the one variator device above the normal average value in that setting will be offset and compensated by a localized decrease of the variator factor of the second pair of variator devices, and a substantially constant value of the overall variator factor of the variator devices is provided for all positions of the said laterally movable wheels of the variator devices.

10. A variable speed transmission mechanism, as claimed in claim 9, wherein the controlled movable device comprises cam means, and the lever operating means is connected to said cam means for moving the carrier in either direction, and resilient means bearing on said carrier parts biasing them towards said cam means.

11. A variable speed transmission mechanism, as claimed in claim 7, wherein the pawls of each individual variator are spaced around the wheel on which they are mounted at distances such that they remain in driving engagement with the teeth of the coacting toothed annulus along an arc of its travel sufficient in extent to ensure that before disengagement of any pawl at least the next succeeding pawl has come into driving engagement with the teeth of said toothed annulus.

12. A variable speed transmission mechanism, as claimed in claim 7, wherein, in each individual variator device, a flanged wheel is provided, said annulus being located within the flange of said wheel, and resilient means between said annulus and said flanged wheel to provide a limited freedom of angular movement between the flanged wheel and the annulus.

13. A variable speed transmission mechanism comprising an input shaft adapted to be driven from a prime mover, an output shaft, differential gearing having three intermeshing rotatable elements one of which is a rotatable spider having freely rotatable planet gears mounted thereon and the other two being sun gears which are in intermeshing engagement with said planet gears, one sun gear rotatable element being connected to the output shaft, and separate gear drives and speed variator means drivingly connecting each of the other two rotatable elements to the input shaft, the said speed variator means for each of said two drives comprising two pairs of unidirectional speed variator devices each having an input end and an output end, each speed variator device consisting of two coacting wheels one of which has a toothed annulus and the other has pawls mounted thereon engaging said toothed annulus for motion transmission, each pair of speed variator device having a toothed annulus wheel of one of the two coacting wheels of one speed variator device in the pair and a pawl mounting wheel of the other of the two coacting wheels of the other speed variator device of the pair transversely movable relative to the axis of their respective fixed coacting wheels from a position coaxial with said respective fixed coacting wheels to positions eccentric to the axis of the respective fixed coacting wheels for motion transmission at equal and at different speeds than the speeds of said respective fixed coacting wheels on the input ends of said speed variator devices of said two pairs of speed variator devices of each drive having its input end drivingly connected in motion transmissible fashion to the input shaft and its output end similarly connected to the respective one of the other two intermeshing rotary elements of the differential gearing and the other pair of speed variator devices of each drive having its input end connected in motion transmissible fashion to the said respective intermeshing rotary element of the differential gearing and its output end similarly connected to the input shaft, a carrier on which the laterally movable wheels of the four pairs of unidirectional speed variator devices are mounted, and lever operating means connected to said carrier for simultaneously moving said laterally movable wheels in lateral directions, whereby when said laterally movable wheels of one pair of variator devices of each drive from the input shaft are laterally displaced for speed variation from a non-speed variating position, the laterally movable wheels of the other pair of speed variators of each of said drives is displaced from its speed variating position towards its non-speed variating position, and forward speeds of the output shaft from zero up to full speed of the prime mover driving the input shaft and upwardly thereof to an overdrive speed of the mechanism are possible, whereas said output shaft is capable of reverse rotation at speeds from zero up to a predetermined limited speed.

14. A variable speed transmission mechanism comprising an input shaft adapted to be driven from a prime mover, an output shaft, two differential gearings in series, each differential gearing having three intermeshing rotatable elements one of which is a rotatable spider having freely rotatable planet gears mounted thereon and the other two being sun gears which are in intermeshing engagement with said planet gears, one sun gear of the first differential gearing being fixed to the output shaft and the other sun gear to the input shaft, the spider of said first differential gear being connected to one sun gear of the second differential gearing, and speed variator means drivingly connecting the other sun gear of the said second differential gearing to the input shaft, and the spider of said second differential gearing being fixed to the input shaft, said speed variator means comprising two pairs of unidirectional speed variator devices, each speed variator device having an input and an output end and consisting of two coacting wheels of which one has a toothed annulus and the other has pawls mounted thereon engaging said toothed annulus for motion transmission, a toothed annulus wheel of one set of two coacting wheels in each pair of speed variator devices and a pawl wheel of the other set of two coacting wheels in each pair of speed variator devices being transversely movable relative to the axis of the respective fixed coacting wheels from a position coaxial with said respective fixed coacting wheels to positions eccentric to the axis of said respective fixed coacting wheels for motion transmission at equal and at different speeds respectively, one pair of said two pairs of speed variator devices having its input end connected in motion transmissible fashion to said input shaft and its output end similarly connected to the said other sun gear of the second differential gearing and the other pair of speed variator devices having its input end connected in motion transmissible fashion to the said other sun gear of the second differential gearing and its output end similarly connected to the input shaft, a carrier in which the lateral movable wheels of the two pairs of unidirectional speed variator devices are mounted, and lever operating means connected to said carrier for moving said carrier in a lateral direction, whereby when said wheels of one pair of variator devices are laterally displaced for speed variation from a non-speed variating position, the wheels of the other pair of speed variators are displaced from their speed variating position towards the non-speed variating position, and forward speeds of the output shaft from zero up to full speed of the prime mover driving the input shaft and upwardly thereof to an overdrive speed of the mechanism are possible whereas the said output shaft is capable of reverse rotation at speeds from zero up to a predetermined limited speed.

References Cited in the file of this patent

UNITED STATES PATENTS

| | | |
|---|---|---|
| 694,959 | Gray | Mar. 11, 1902 |
| 1,702,923 | Aeppli | Feb. 19, 1929 |